United States Patent
Normann et al.

(10) Patent No.: US 6,181,241 B1
(45) Date of Patent: Jan. 30, 2001

(54) METHOD OF ALLOCATING TRANSMITTERS OF A TIRE PRESSURE MONITORING SYSTEM TO A PARTICULAR VEHICLE

(75) Inventors: Norbert Normann, Niefern-Öschelbronn; Ralf Kessler, Söllingen; Gunter Schulze, Ispringen, all of (DE)

(73) Assignee: Beru Aktiengesellschaft (DE)

( * ) Notice: Under 35 U.S.C. 154(b), the term of this patent shall be extended for 0 days.

(21) Appl. No.: 09/077,122

(22) PCT Filed: Nov. 15, 1996

(86) PCT No.: PCT/EP96/05019

§ 371 Date: May 18, 1998

§ 102(e) Date: May 18, 1998

(87) PCT Pub. No.: WO97/18961

PCT Pub. Date: May 29, 1997

(30) Foreign Application Priority Data

Nov. 17, 1995 (DE) ................................. 195 42 833
Mar. 5, 1996 (DE) ............................. 196 08 479

(51) Int. Cl.⁷ .................................................. B60C 23/00
(52) U.S. Cl. ........................................... 340/447; 340/442
(58) Field of Search .................................. 340/442, 443, 340/444, 445, 446, 447, 448, 825.72, 825.79; 73/146.2, 146.3

(56) References Cited

U.S. PATENT DOCUMENTS

| 4,163,208 | * | 7/1979 | Merz | .................................. 340/442 |
| 4,696,058 | * | 9/1987 | Tachita et al. | ....................... 455/277 |

* cited by examiner

Primary Examiner—Nina Tong
(74) Attorney, Agent, or Firm—Orum & Roth

(57) ABSTRACT

A vehicle tire pressure monitoring system includes a pressure sensor, a transmitter, and a transmitting antenna at each of N wheels of the vehicle, and at least one receiving antenna attached to the vehicle, respectively allocated to each transmitting, antenna. The receiving, antenna is connected to an electronic receiving, and analysis system which determines whether a signal belongs to the local vehicle by allocating an identifier characterizing the individual wheel to its transmitter. Emitted signals contain the identifier and are forwarded to the central electronic receiving and analysis system, which records the signal intensities under the signal's identifier, compares the intensities, selects those N transmitter identifiers with the greatest intensities, then stores the N transmitter identifiers as belonging to the vehicle.

9 Claims, 1 Drawing Sheet

METHOD OF ALLOCATING TRANSMITTERS OF A TIRE PRESSURE MONITORING SYSTEM TO A PARTICULAR VEHICLE

BACKGROUND OF THE INVENTION

Previously-known tire pressure monitoring systems include a pressure sensor, transmitter, and transmission antenna, with respective allocated receiving antennas and a central electronic analysis system on the vehicle body. The problem that arises with tire pressure monitoring systems of this kind is unequivocal allocation of the transmitters to the respective wheel position. In the past, the problem of position recognition is was solved as follows-the transmitters generate a signal divided into four segments, consisting of preface, identification signal, measurement signal, and conclusion. The central electronic analysis system can recognize the position based on the identification signal. Doing so, however, first requires first performing an initialization during which the respective identification signal, linked to the respective position, is stored by the central electronic analysis system. To perform this initialization, the system must be switched into a "pairing" mode, and each individual transmitter must then be activated once in sequence. The system is then switched back into measurement mode until the transmitter positions change, e.g. if a wheel is changed. This means, however, that a suitably trained person must perform this initialization each time a wheel is changed. In some circumstances it is therefore impossible, or possible only at the cost of safety, to perform a wheel change at any repair shop or at home. Flawless operation of the system cannot be guaranteed due to potential operating errors.

In another known system, the problem is circumvented by recording the data for the pressure sensors and the transmission electronics connected to them by means of a remote-control element instead of by means of the central electronic system. The remote-control element comprises an LCD display device which makes it possible to read the tire pressure. To determine the tire pressure, the desired information must be interrogated at each individual wheel by means of the remote-control element. Although this method offers the advantage of an unequivocal allocation of readings, it does not allow tire pressure to be checked while driving.

SUMMARY OF THE INVENTION

The object of the present invention is therefore to develop a method for position recognition which demands no special abilities of even inexperienced mechanics or automobile owners when it is necessary, after wheels are first mounted and after a wheel change, to recognize, on the basis of the signals with different identifiers which are emitted from multiple wheels, which signals derive from the vehicle's own wheels. The intent is to rule out any failure due to possible operating errors.

According to the invention, a central electronic analysis system records the intensities at which the same transmitter is received at a receiving antenna. These values are then compared, multiple successively received signals are taken into consideration in order to avoid incorrect allocations. An average can then be taken of the multiple signals, or a simple count is made of how often the event occurs in which a specific antenna most strongly receives a transmitter, i.e. a signal with a specific identifier. Based on the average or the greatest number of events, the transmitter transmitting with that identifier, or the pertinent wheel, is then classified as belonging to the local vehicle, and the identifier is stored in the central receiving and electronic analysis system as the identifier of a local wheel. The procedure is the same for the second-strongest signal, third-strongest signal, etc., until the Nth-strongest signal has been identified, N being the number of wheels mounted on the vehicle, which can include an onboard spare wheel if it is housed so that the signals emitted by it are not too strongly shielded. If a spare wheel in the trunk is so strongly shielded that the signals emitted by it cannot be received more strongly than the signals proceeding from adjacent vehicles, the spare wheel should then not be included in the recognition process of the invention.

If the vehicle has, for example, four wheels, then according to he invention the four strongest signals with four different identifiers are determined and stored; taking a spare wheel into consideration, there may also be five identifiers for the total of five wheels. If additional signals are received thereafter, having an identifier which does not match any of the stored identifiers, these are not taken into account—or are taken into account in subordinate fashion in the tire pressure monitoring process.

If a distinction is to be made between running wheels of a vehicle and one or more spare wheels being carried in the vehicle, this is advantageously possible by means of the invention.

Signals which derive from transmitters located on wheels which are rotating (running wheels) are received with fluctuating signal levels because the location of the transmitter relative to the receiving antenna changes cyclically as a result of the wheel rotation. The situation is different for onboard spare wheels. When signals emitted from a spare wheel are received, they do not exhibit the fluctuations in signal level resulting from vehicle motion. This makes it possible to find an additional criterion by which to distinguish between signals coming from a spare wheel and signals coming from running wheels. If, while the vehicle is in motion, a received signal does not exhibit any of the fluctuations in signal level caused by wheel rotation, it may be concluded therefrom that it derives from an onboard spare wheel and not from a running wheel, even if that signal whose level exhibits no motion-related fluctuations is received at by the receiving antenna at the greatest intensity. Such a signal is either allocated to a spare wheel or is left entirely out of consideration (the latter, in particular, if onboard spare wheels are not intended to be monitored). This development of the invention has the advantage that the risk of erroneous allocations is once again reduced. This is true particularly with regard to those running wheels which are located at approximately the same distance as, or farther away than, the spare wheel, so that the signal emitted from the spare wheel is received at approximately the same intensity as, or a higher intensity than the signals emitted from a running wheel. The development of the invention ensures that an erroneous allocation does not occur even in this unfavorable case.

This method is useful not only when as is usual, a single spare wheel is carried on board, but also when multiple replacement wheels are carried. When additional wheels with snow tires are carried in the trunk, for example, the signals emitted by them cannot disrupt the correct allocation of the running wheels to their receiving antennas.

Another possibility for distinguishing between signals coming from rotating wheels and signals coming from replacement wheels involves use of the fact that in the initial phase of vehicle motion after motion begins, the tire temperature generally rises due to flexing. This is not the case with a spare wheel, since its tire is not flexed. If a temperature sensor is provided in the tire pressure monitoring system at each wheel in addition to the pressure sensor, and if the signal emitted by the transmitter on the wheel transfers information not only about tire pressure but also about tire temperature, a temperature rise signaled after vehicle motion begins can then be evaluated as an indication that the signal derives from a rotating wheel and not from a spare wheel.

It is sufficient if the vehicle has only a single receiving antenna, which is housed at a suitable point on the underside of the body or chassis so that it can receive signals at sufficient intensity from all the wheels attached to the vehicle. It is also possible, however, to allocate a separate antenna to each wheel in the latter's vicinity. In this case the ranking of the intensity at which the signals are received by the various antennas will differ from one antenna to another, since each antenna will receive at the greatest intensity that signal which is proceeding from the wheel closest to it. The group of the N strongest signals with different identifiers will, however, be the same for each of the receiving antennas,—only the ranking within the group will differ from one receiving antenna to another. To recognize the identifiers possessed by the wheels belonging to the local vehicle, it is sufficient to determine the N members of the group. If one of the receiving antennas should receive most strongly a group of N signals whose identifiers do not completely match the N identifiers which the other receiving antennas have recorded with the N greatest intensities, then an erroneous measurement must be present, which can be corrected by repetition of the measurement and analysis. Recognition reliability can therefore be improved by working with multiple antennas.

Since the receiving antenna directly adjacent to a transmitter generally receives the signal at greater intensity than the other receiving antennas, and since multiple signals are also be utilized for analysis, this method not only makes possible recognition of the wheels and their identifiers belonging to the local vehicle, but it is also possible to recognize which wheel is located at which point on the vehicle.

Since the method according to the invention operates automatically, there can inherently be no problems due to operating errors.

DETAILED DESCRIPTION OF THE PREFERRED EMBODIMENT

Figure 1:
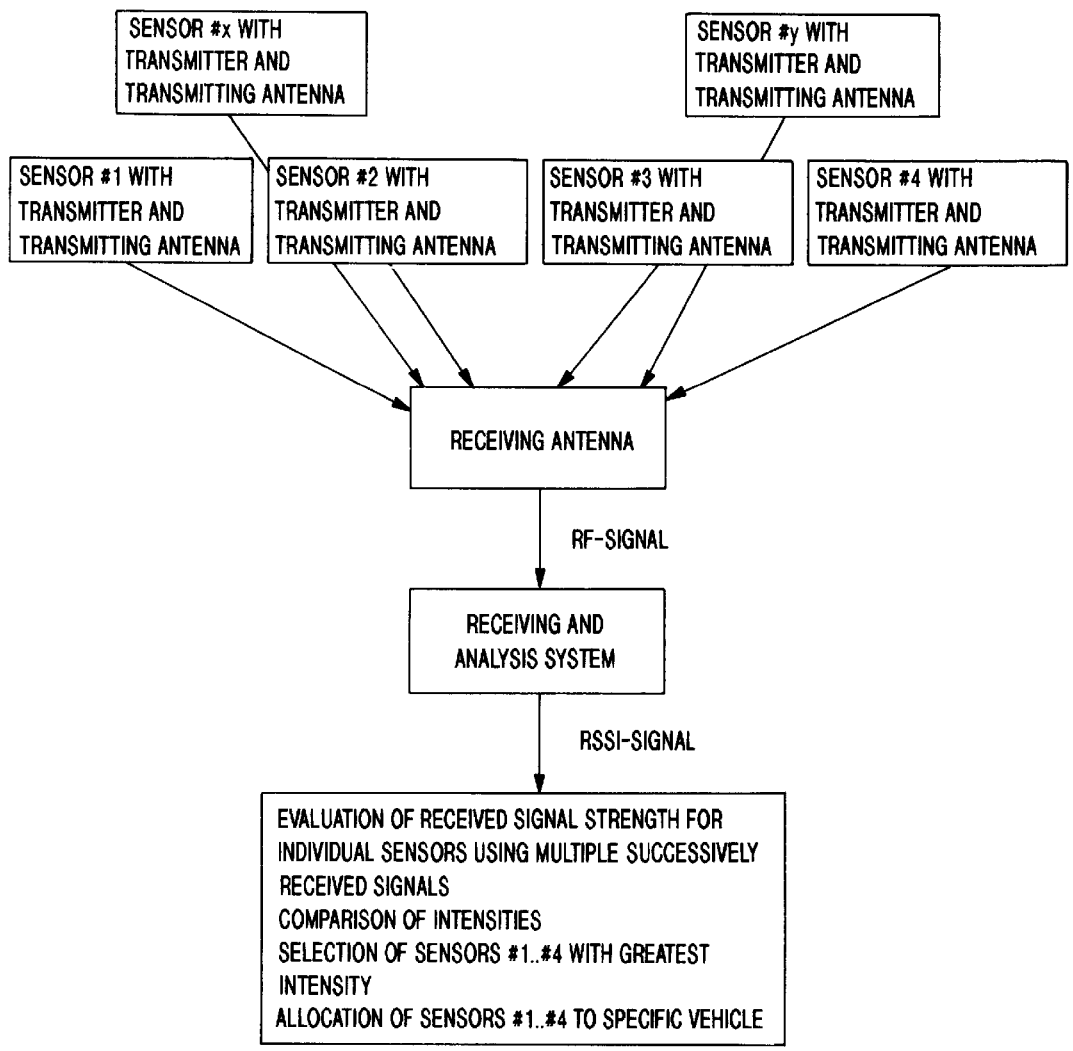
FIG. 1 is a diagrammatic view showing the signal allocation process of the invention.

The manner in which the position on the vehicle of a wheel with a specific identifier can be recognized automatically is described in the PCT patent application entitled "Method for allocating transmitters to receiving antennas in tire pressure monitoring systems," filed on the same date and claiming the priority of German patent applications 195 42 833.1 and 196 08 478.4, which are hereby incorporated by reference.

A possible procedure for storing the data obtained from multiple receiving antennas and transmitted to the electronic analysis system involves use of an allocation matrix, consisting of all the transmitter identifiers and receiving antennas. In the course of the allocation process, the value in a matrix cell is incremented when the greatest intensity is measured for the relevant combination of receiving antenna and transmitter identifier.

If the tire pressure monitoring system has only a single centrally mounted receiving antenna, the matrix is then reduced to a list in which the transmitter identifiers of the received signals are entered, and are analyzed or weighted in accordance with the received intensity.

The development of the method according to the invention can be quicker if the value of a matrix cell or list place is incremented not by a fixed value but by a value weighted in terms of the intensity difference the result will be that the matrix cells or list places with the N greatest values can be determined more quickly. If a simple count is made of the number of events in which a signal with a specific identifier was received by a specific antenna at the greatest, second greatest, . . . Nth-greatest intensity, it is correspondingly possible to weight the count, for example by counting the event N times if the intensity of a signal with a specific identifier at an antenna was highest, counting the event N-1 times if the intensity was second-strongest, counting N-2 times if the intensity was third-strongest, etc.

The overall result is thus a reliable and quick allocation which, because it operates automatically, rules out possible operating errors. It is also possible to record transmitter modifications or even interchanges caused by possible wheel changes with no need for external action on the system. With this, at regular intervals the value of the list places or matrix cells for transmitters with allocated receiving antennas is set to a fixed value Ds, while the value of list places or matrix cells for transmitters without allocated receiving antennas is set to zero. The value Ds can be used to define a time after which the allocation is determined again. This could be done, for example, by counting down from the fixed value Ds at defined time intervals. Once the value of the relevant matrix cells or list places then reaches zero, the allocation is determined again. This could also happen each time the vehicle is started. Preferably an identifier is evaluated as belonging to the local vehicle only if the (optionally weighted) intensity of the received signal exceeds a threshold value. This increases the certainty that a wheel located in the vicinity but not belonging to the vehicle will incorrectly be recorded as belonging to the local vehicle. In addition, it is thereby possible to recognize malfunctions of the transmitter for a wheel belonging to the local vehicle, for example, the absence of a signal, excessively weak radiation of the signal, or the weakening or failure of a battery which is operating the wheel's transmitter. In this instance the central electronic receiving and analysis system can only record fewer than the reference number N of identifiers, and issue an error message. The system is also thereby prevented from recording, instead of the identifier of an onboard wheel, the identifier of a more-weakly received signal from a wheel which belongs to a different vehicle located in the vicinity.

It often happens that signals are received from wheels which belong to other vehicles, i.e. from adjacent vehicles in parking lots, from vehicles passing by on the road, or, in a repair shop, signals from wheels which are stored in the vicinity of the vehicle; or even from wheels which are additionally being carried in the local vehicle on the occasion of a wheel change. Signals with identifiers which do not match stored identifiers allocated to the local vehicle are preferably not completely ignored, but rather are stored in the central electronic receiving and analysis system in a separate list or matrix, and pre-analyzed therein. Only if one or more identifiers have emerged as unequivocally dominant in the separate list or matrix, because they occur regularly or much more often than other identifiers, are they then included in the next recognition process executed according to the invention, in competition with the identifiers previously recognized and recorded as belonging to the local vehicle, so that any wheel changes performed in the interim can then also be detected and taken into account by the central electronic receiving and analysis system. It would also be possible, however, arbitrarily to initiate a recognition process according to the invention after each wheel change.

What is claimed is:

1. A method for allocating to a vehicle, transmitters of a tire pressure monitoring system which includes a respective pressure sensor, a transmitter, and a transmitting antenna at each of N wheels of the vehicle, at least one receiving antenna respectively allocated on a body of said vehicle to be monitored, and an electronic receiving and analysis system, each of said N wheels includes an identifier which characterizes the individual wheel to the respective transmitter, associated at said wheel so that each respective transmitter emits signals containing the identifier, which signals are forwarded to the central electronic receiving and analysis system, the method comprising the steps of:

recording an intensity of each of the signals transmitted from the various transmitters to the receiving antenna, in conjunction with the transmitted signal identifier;

comparing the intensities of the signals having different identifiers received by one and the same receiving antenna, wherein multiple successively received signals having the different identifiers are taken into account in the intensity comparison;

selecting the N transmitter identifiers with the relatively greatest intensities received at the receiving antenna; and storing the N transmitter identifiers in the central electronic receiving and analysis system as belonging to the vehicle to be monitored;

establishing in the electronic analysis system a list when the vehicle has only a single receiving antenna, and a matrix when the vehicle has a multiplicity of receiving antennas;

assigning each of the list places and each of the matrix cells to a combination of a specific receiving antenna and a specific identifier contained in the received signals; and incrementing a value of the list place or the value of the individual matrix cell when a maximum intensity is recorded for the relevant combination of transmitter identifier and receiving antenna.

2. The method as defined in claim 1, incrementing the value by which a number of events which are assigned to a specific combination of receiving antenna and identifier when a further event occurs, or incrementing the content of a matrix cell or a list place, which is weighted as a function of intensity.

3. The method as defined in claim 2, setting the values in the matrix cells and the list places at specific time interval to a fixed value Ds for transmitters allocated to the vehicle and setting the values in the list places to zero for transmitters not allocated to the vehicle, said Ds defining a time after which the allocation is checked.

4. The method as defined in claim 1, evaluating an identifier as belonging to the local vehicle only when the intensity of the received signal exceeds a threshold value.

5. The method as defined in claim 1, incorporating signals with an identifier not yet recorded as belonging to the local vehicle into the intensity comparison only if they occur with conspicuously high intensity.

6. The method as defined in claim 1, incorporating signals with an identifier not yet recorded as belonging to the local vehicle into the intensity comparison only if they occur conspicuously often.

7. The method as defined in claim 1, incorporating signals with an identifier not yet recorded as belonging to the local vehicle into the intensity comparison only if they occur with conspicuously high intensity and conspicuously often.

8. A method for allocating to a vehicle, transmitters of a tire pressure monitoring system which includes a respective pressure sensor, a transmitter, and a transmitting antenna at each of N wheels of the vehicle, at least one receiving antenna respectively allocated on a body of said vehicle to be monitored, and an electronic receiving and analysis system, each of said N wheels includes an identifier which characterizes the individual wheel to the respective transmitter, associated at said wheel so that each respective transmitter emits signals containing the identifier, which signals are forwarded to the central electronic receiving and analysis system, the method comprising the steps of:

recording an intensity of each of the signals transmitted from the various transmitters to the receiving antenna, in conjunction with the transmitted signal identifier;

comparing the intensities of the signals having different identifiers received by one and the same receiving antenna, wherein multiple successively received signals having the different identifiers are taken into account in the intensity comparison;

selecting the N transmitter identifiers with the relatively greatest intensities received at the receiving antenna; and storing the N transmitter identifiers in the central electronic receiving and analysis system as belonging to the vehicle to be monitored;

examining the signals from each one of the transmitters for fluctuations in the signal level and wherein the transmitters whose signals are received with fluctuating signal levels as a result of vehicle motion are allocated to running wheels, whereas any transmitters whose signals are received with a signal level which does not fluctuate as a result of vehicle motion are one of allocated to at least one onboard spare wheel, or are left out of consideration.

9. A method for allocating to a vehicle, transmitters of a tire pressure monitoring system which includes a respective pressure sensor, a temperature sensor, a transmitter, and a transmitting antenna at each of N wheels of the vehicle, at least one receiving antenna respectively allocated on a body of said vehicle to be monitored, and an electronic receiving and analysis system; each of said N wheels includes an identifier which characterizes the individual wheel to the respective transmitter, associated at said wheel so that each respective transmitter emits signals containing the identifier, which signals are forwarded to the central electronic receiving and analysis system, the method comprising the steps of:

recording an intensity of each of the signals transmitted from the various transmitters to the receiving antenna, in conjunction with the transmitted signal identifier;

comparing the intensities of the signals having different identifiers received by one and the same receiving antenna, wherein multiple successively received signals having the different identifiers are taken into account in the intensity comparison;

selecting the N transmitter identifiers with the relatively greatest intensities received at the receiving antenna; and storing the N transmitter identifiers in the central electronic receiving and analysis system as belonging to the vehicle to be monitored;

examining the signals from each one of the transmitters for a temperature rise, wherein signals indicating a temperature rise as a result of vehicle motion are allocated to running wheels, whereas signals without indication of a temperature rise are allocated to at least one onboard spare wheel, or are left out of consideration.

\* \* \* \* \*